United States Patent [19]

Awajitani et al.

[11] Patent Number: 4,988,589
[45] Date of Patent: Jan. 29, 1991

[54] PASTE-TYPE CADMIUM ELECTRODE FOR USE IN AN ALKALINE STORAGE CELL AND ITS MANUFACTURING METHOD

[75] Inventors: Takahisa Awajitani; Masayuki Terasaka; Masakazu Takemura; Hironori Honda, all of Sumoto, Japan

[73] Assignee: Sanyo Electric Co., Ltd., Osaka, Japan

[21] Appl. No.: 466,530

[22] Filed: Jan. 17, 1990

[30] Foreign Application Priority Data

Jan. 18, 1989 [JP] Japan ................................. 1-10309
May 18, 1989 [JP] Japan ................................. 1-124915

[51] Int. Cl.$^5$ ............................................. H01M 4/38
[52] U.S. Cl. ...................................... 429/222; 429/60
[58] Field of Search ............... 429/222, 60, 217, 209, 429/223; 252/182.1

[56] References Cited

U.S. PATENT DOCUMENTS

| | | | |
|---|---|---|---|
| 4,614,696 | 9/1986 | Itou et al. | 429/222 |
| 4,826,744 | 5/1989 | Jto et al. | 429/222 X |
| 4,938,780 | 7/1990 | Kaiya et al. | 429/222 X |

FOREIGN PATENT DOCUMENTS 60-216449 10/1985 Japan.
61-240576 10/1986 Japan.
62-243254 10/1987 Japan.

Primary Examiner—Anthony Skapars
Attorney, Agent, or Firm—Armstrong, Nikaido, Marmelstein, Kubovcik & Murray

[57] ABSTRACT

A paste-type cadmium electrode for use in an alkaline storage cell, comprising a conductive substrate, an active material layer mainly comprising cadmium oxide and formed on a surface of the conductive substrate, and a conductive layer or a nickel body formed on a surface of the active material layer.

The conductive layer either has therein powdered carbon and powdered alkali-resistant metal having a surface area of 0.001 to 0.5 m$^2$ against 1 g of the active material; comprises powdered carbon, a binder and powdered alkali-resistant metal having an apparent density of 0.2 g/cc or less; or comprises a first conductive layer formed on a surface of the active material layer and comprising powdered alkali-resistant metal and a binder, and a second conductive layer formed on a surface of the first conductive layer and comprising powdered carbon and a binder.

The nickel body is dispersed on a surface of the active material layer, the nickel body comprising fiber-type nickel having an average fiber diameter of 1 μm or less and/or powdered nickel having an average grain size of 1 μm or less.

11 Claims, 9 Drawing Sheets

PASTE-TYPE CADMIUM ELECTRODE FOR USE IN AN ALKALINE STORAGE CELL AND ITS MANUFACTURING METHOD

BACKGROUND OF THE INVENTION (1) Field of the Invention

This invention relates to a paste-type cadmium electrode for use in an alkaline storage cell such as a nickel-cadmium cell and its manufacturing method.

(2) Description of the Prior Art

As a cadmium negative electrode for use in an alkaline storage cell like a nickel-cadmium storage cell, a paste-type cadmium non-sintered negative electrode is widely used in the industrial field because it is manufactured easily and at a low cost. This type of cadmium electrode is produced by, for example, kneading an active material such as powdered cadmium oxide or powdered cadmium hydroxide with a binding solution to form a paste, coating the paste on a conductive substrate and drying it. However, this type of cadmium electrode has a problem of low absorption of oxygen gas, and various proposals have been made to solve this problem.

For example, Japanese Patent Publication laid-open Nos. 60-216449 and 61-240576 have proposed forming a conductive layer comprising carbon or an alkali-resistant conductive substance such as nickel on a surface of a paste-type cadmium electrode plate. This method increases the conductivity of the surface of the cadmium electrode plate and promotes formation of metal cadmium on the surface, whereby heightening the oxygen gas absorbing ability of the electrode plate.

However, the above-attained oxygen gas absorbing ability is not enough, and moreover other problems occur when an alkali-resistant substance is used to form a conductive layer.

The reason why the above-attained absorbing ability is not enough will be explained hereinafter. When a conductive layer comprising powdered carbon is formed on the surface of the paste-type cadmium electrode plate, the metal cadmium formation is promoted on an interface between the conductive layer and the active material layer during charging, whereby the oxygen gas absorbing ability is improved. However, the metal cadmium formation is not promoted inside the conductive layer or on its surface, where metal cadmium and oxygen gas are most easily reacted with each other. Therefore, the cadmium electrode plate does not have enough oxygen gas absorbing ability.

When a conductive layer comprising an alkali-resistant substance such as powdered nickel is formed on the surface of the paste-type cadmium electrode plate, the metal cadmium formation is promoted inside and on the surface of the conductive layer during charging due to the high conductivity of the conductive substance. As a result, the oxygen gas absorbing ability of the electrode plate is further improved than when powdered carbon is used. However, this method involves other problems of promotion of hydrogen gas and dendrite generation and decrease of the cell storage characteristic.

Another proposal, which is a combination of the above two, is forming a conductive layer comprising a mixture of powdered carbon and a powdered alkali-resistant metal on the surface of the paste-type cadmium electrode plate. This method cannot solve the above problems either if powdered nickel only or the like is used as the powdered alkali-resistant metal.

Apparently from the above, it is indispensable to modify the conditions of the powdered alkali-resistant metal inside the conductive layer to solve the above problems while maintaining the oxygen gas absorbing ability.

Usually, the apparent density of a powdered alkali-resistant metal is 0.2 g/cc or more (0.5 g/cc in the case of carbonyl nickel). This means it is almost impossible to uniformly disperse the powdered alkali-resistant metal into a slurry comprising powdered carbon and a binder. Accordingly, it is also hardly possible that a conductive layer which is produced by coating the slurry on the surface of the electrode plate and drying it has the powdered alkali-resistant metal uniformly dispersed therein.

Moreover, such alkali-resistant metals as nickel and iron are low in hydrogen overvoltage than a compound such as cadmium oxide acting as an active material. Therefore, if the conductive layer has too high a conductivity, hydrogen gas may be generated on the liquid-solid interface during charging. This means the form and range of amount of nickel should be determined.

If powdered nickel is used as a powdered alkali-resistant metal, each nickel grain is contacted with the active material at a point. Since the metal cadmium produced during charging reaches the surface of the electrode plate, only the nickel existing on the surface of the electrode plate contributes to the improvement of conductivity. If too much nickel is added to utilize as much nickel as possible, the electrode plate has high enough a conductivity to generate hydrogen gas.

If the surface of the paste-type cadmium electrode plate is nickel-plated, the surface is covered with a nickel layer to result in promoting hydrogen gas generation and in preventing electrode reaction.

Adding a fiber-type metal to the conductive layer is effective in forming a network of metal cadmium on the surface of the paste-type cadmium electrode plate. However, since the fiber diameter of fiber-type nickel is as large as several to tens of several micron meters and so the fibers are poor in flexibility, the fibers are pierced into the separator and possibly occur shortcircuiting of the cell.

Usually in producing such a cadmium negative electrode plate, electrochemical formation for conducting reserve charging amount is eliminated and thus simplify the manufacturing procedure by mixing metal cadmium produced by reserve charging to the active material paste including cadmium oxide or the like. However, metal cadmium is low in utilization factor of the active material in general. Japanese Patent Publication laid-open No. 62-243254 has proposed using metal cadmium including indium in order to stimulate the reaction with metal cadmium. Even this method cannot increase the utilization factor enough while solving the above problems.

SUMMARY OF THE INVENTION

Accordingly, a primary object of this invention is to offer a paste-type cadmium electrode which has improved oxygen gas absorbing ability.

Another object of this invention is to offer a paste-type cadmium electrode which restricts hydrogen gas generation during charging.

Still another object of this invention is to offer a paste-type cadmium electrode which restricts dendrite generation during charging.

Still another object of this invention is to offer a paste-type cadmium electrode which has an electrode plate and a conductive layer comprising a powdered alkali-resistant metal formed on the electrode plate, the conductive layer being characterized in that the powdered alkali-resistant metal is uniformly dispersed therein.

Still another object of this invention is to offer a paste-type cadmium electrode which restricts shortcircuiting in a cell employing the electrode caused by a nickel body dispersed on a surface of an electrode plate.

Still another object of this invention is to offer a paste-type cadmium electrode which has improved utilization factor of an active material.

The above objects are fulfilled by a paste-type cadmium electrode for use in an alkaline storage cell, comprising a conductive substrate; an active material layer mainly comprising cadmium oxide and formed on a surface of the conductive substrate; and a conductive layer formed on a surface of the active material layer, the conductive layer having therein powdered carbon and powdered alkali-resistant metal having a surface area of 0.001 to 0.05 $m^2$ against 1 g of the active material.

The above objects are also fulfilled by a method of manufacturing a paste-type cadmium electrode for use in an alkaline storage cell, comprising the steps of coating an active material mainly comprising of cadmium oxide on a conductive substrate to form an active material layer; coating a slurry on the active material layer, the slurry being obtained by kneading powdered carbon, a binder and powdered alkali-resistant metal having a surface area of 0.001 to 0.05 $m^2$ against 1 g of the active material; and drying the slurry.

The reasons will follow.

The powdered alkali-resistant metal in the conductive layer including carbon is a core in forming metal cadmium on the surface of the electrode plate. This fact is combined with the high conductivity inherent in the conductive layer including carbon and with promotion of the metal cadmium formation on an interface between the conductive layer and the active material layer, whereby to increase the oxygen gas absorbing ability of the cadmium electrode plate.

With respect to increasing the above absorbing ability, the amount of metal cadmium formed on the surface of the electrode plate does not matter if it is formed uniformly. Forming too much metal cadmium changes itself to be the active material, and causes dendrite generation and other problems. This means adding the alkali-resistant metal in an excessive amount is not desirable. Adding too much alkali-resistant metal also possibly lowers the cell storage characteristic and promotes hydrogen gas generation. The inventors of this invention have found out through experiments that hydrogen gas generation is most closely related with the total surface area of the powdered alkali-resistant metal against 1 g of the active material. Considering that the powdered alkali-resistant metal is a core for forming metal cadmium and that using the metal having larger surface area is desirable in forming metal cadmium, the inventors have concluded the above total surface area is most desirably 0.001 to 0.05 $m^2$ against 1 g of the active material.

The above objects are also fulfilled by a paste-type cadmium electrode for use in an alkaline storage cell, comprising a conductive substrate; an active material layer mainly comprising cadmium oxide and formed on a surface of the conductive substrate; and a conductive layer formed on a surface of the active material layer, the conductive layer comprising powdered carbon, a binder and powdered alkali-resistant metal having an apparent density of 0.2 g/cc or less.

The above objects are also fulfilled by a method of manufacturing a paste-type cadmium electrode for use in an alkaline storage cell, comprising the steps of coating an active material mainly comprising of cadmium oxide on a conductive substrate to form an active material layer; coating a slurry on the active material layer, the slurry being obtained by kneading powdered carbon, a binder and powdered alkali-resistant metal having an apparent density of 0.2 g/cc or less; and drying the slurry.

The reasons will follow.

The conductive layer including powdered carbon promotes the metal cadmium formation on the interface between the conductive layer and the active material layer. When the powdered alkali-resistant metal is added to the conductive layer, the above alkali-resistant metal promotes the metal cadmium formation inside the conductive layer, whereby the metal cadmium formation is promoted both on the above interface and inside the conductive layer. The metal cadmium inside the conductive layer is most effective when it is formed uniformly.

Due to the promotion of the metal cadmium formation both on the above interface and inside the conductive layer, oxygen gas absorbing ability of the electrode plate is improved, whereby to keep the cell cycle life long. The uniform formation of the metal cadmium inside the conductive layer is achieved by employing a powdered alkali-resistant metal having a low apparent density. The inventors have found out through experiments that an apparent density of 0.2 g/cc or less is most desirable in improving the dispersion of the metal and thus in raising the oxygen gas absorbing ability.

The above objects are also fulfilled by a paste-type cadmium electrode for use in an alkaline storage cell, comprising a conductive substrate; an active material layer mainly comprising cadmium oxide and formed on a surface of the conductive substrate; a first conductive layer formed on a surface of the active material layer, the first conductive layer comprising powdered alkali-resistant metal and a binder; and a second conductive layer formed on a surface of the first conductive layer, the second conductive layer comprising powdered carbon and a binder.

The above objects are also fulfilled by a method of manufacturing a paste-type cadmium electrode for use in an alkaline storage cell, comprising the steps of coating an active material mainly comprising of cadmium oxide on a conductive substrate to form an active material layer; coating a first slurry on the active material layer, the first slurry comprising powdered alkali-resistant metal and a binder; drying the first slurry to form a first conductive layer; coating a second slurry on a surface of the first conductive layer, the second slurry comprising powdered carbon and a binder; and drying the second slurry to form a second conductive layer.

The reasons will follow.

When only the second conductive layer comprising powdered carbon and a binder is formed on the active material layer, metal cadmium is formed on an interface between the conductive layer and the active material layer during charging.

If the first conductive layer comprising a powdered alkali-resistant metal and a binder is interposed between the active material layer and the second conductive layer so that the first conductive layer is contacted with the active material layer, the powdered alkali-resistant metal is covered with the metal cadmium. As a result, hydrogen gas is restricted from generating from the powdered alkali-resistant metal during charging. Moreover, the high conductivity inherent in the powdered alkali-resistant metal promotes the metal cadmium formation, whereby to remarkably improve the oxygen gas absorbing ability of the electrode plate.

As the powdered alkali-resistant metal, powdered nickel is most desirable.

The above objects are also fulfilled by a paste-type cadmium electrode for use in an alkaline storage cell, comprising a conductive substrate; an active material layer mainly comprising cadmium oxide and formed on a surface of the conductive substrate; and a nickel body dispersed on a surface of the active material layer, the nickel body comprising at least one of fiber-type nickel having an average fiber diameter of 1 μm or less and powdered nickel having an average grain size of 1 μm or less.

The above objects are also fulfilled by a method of manufacturing a paste-type cadmium electrode for use in an alkaline storage cell, comprising the steps of coating an active material mainly comprising of cadmium oxide on a conductive substrate to form an active material layer; and dispersing a nickel body on a surface of the active material layer, the nickel body comprising at least one of fiber-type nickel having an average fiber diameter of 1 μm or less and powdered nickel having an average grain size of 1 μm or less.

The reasons will follow.

A network of metal cadmium can be formed on the surface of electrode plate during charging by dispersing a nickel body comprising fiber-type nickel having an average fiber diameter of 1 μm or less and/or powdered nickel having an average grain size of 1 μm or less on the above surface. As a result, the oxygen gas absorbing ability of the electrode plate is remarkably improved. Since such a small nickel body is easily constricted or broken by a small force, there is no possibility that the nickel body is pierced into the separator to occur short-circuiting in the cell. Moreover, since the nickel body is covered with the metal cadmium, hydrogen gas generation is prevented.

The nickel body desirably has a structure in which fibers and grains are contacted or sintered to be connected with one another while being uniformly directed. For example, the one having an average fiber diameter of 0.6 μm and a fiber length of several micron meters produced by INCO Ltd. is desirable.

The above objects are also fulfilled by a paste-type cadmium electrode comprising an electrode plate and a conductive layer formed on the electrode plate, the electrode plate mainly comprising powdered cadmium oxide and powdered metal cadmium including indium and the conductive layer having therein powdered carbon and powdered nickel, wherein the above cadmium electrode is characterized in that $x \geq 0.001$, $y \geq 0.002$ and $y \leq -0.4x + 0.02$, where y is a weight ratio (%) of the indium against an active material comprising powdered cadmium oxide and powdered metal cadmium including indium and x (m$^2$) is a surface area of the nickel against 1 g of the active material.

The reasons will follow.

As mentioned before, the conductive layer including powdered carbon promotes the metal cadmium formation on the interface between the conductive layer and the active material layer, whereby to improve the oxygen gas absorbing ability of the electrode plate. However, the above conductive layer does not promote the metal cadmium formation inside itself layer or on its surface, where metal cadmium and oxygen gas are most easily reacted with each other.

On the other hand, the conductive layer comprising powdered nickel is a core in forming metal cadmium during charging on the surface of the electrode plate. As a result, the oxygen gas absorbing ability is further improved than when powdered carbon is used. Since nickel has lower hydrogen overvoltage than the cadmium compound acting as an active material and thus lowers the hydrogen gas-generating electric potential of the electrode plate, whereby to easily generate hydrogen gas, it is not desirable to add nickel in an excessive amount.

An optimum amount of nickel for improving the oxygen gas absorbing ability while restricting hydrogen gas generation can be found by testing conductive layers comprising powdered carbon and powdered nickel in various amounts. However, an optimum amount of nickel is closely related with the amount of indium added to the metal cadmium for the purpose of improving the utilization factor of the active material. This is because the more indium is added, the lower the charging potential of the negative electrode is, namely, the more indium is added, the smaller the difference between the hydrogen gas-generating potential and the charging potential of the electrode plate is. The inventors have found through experiments the following optimum relationship between the amounts of nickel and indium for improving the oxygen gas absorbing ability and the utilization factor of the active material while restricting hydrogen gas generation. In the following paragraphs, x means the surface area of nickel against 1 g of the active material and y means the weight ratio(%) of indium against the whole active material.

The oxygen gas absorbing ability can effectively be improved by employing nickel in $x \geq 0.001$ m$^2$. Employing this amount of nickel together with carbon is more effective than employing only carbon. Nickel in the above surface area sufficiently promotes the metal cadmium formation inside and on the surface of the conductive layer. On the other hand, the conductive layer inherently promotes charging of a portion of the active material, the portion being contacted with the conductive layer. These two facts are combined to improve the oxygen gas absorbing ability. The utilization factor can remarkably be improved by adding indium in the metal cadmium in $y \geq 0.002$ wt.%. Hydrogen gas generation is promoted whether nickel or indium is added. However, if x and y are determined to realize $y \leq -0.4x + 0.02$, hydrogen gas partial generation is restricted even in such a condition for easily generating hydrogen gas as charging at a large current in a low temperature.

In conclusion, the optimum relationship between the amounts of indium and nickel is: $x \geq 0.001$ m$^2$, $y \geq 0.002$ wt.% and $y \leq -0.4x + 0.02$.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENT

Embodiment I

Experiment I

An active material formed of 900 g of powdered cadmium oxide and 100 g of powdered metal cadmium, 20 g of magnesium oxide as a dendrite preventor, 6 g of hydroxypropyl cellulose (HPC) as a binder, 10 g of nylon fiber as a reinforcing agent and 300 cc of an aqueous solution of sodium phosphate as a hydration preventor were kneaded to obtain an active material paste. The paste was coated on a surface of a conductive substrate formed of a punched metal and dried to obtain a cadmium electrode plate acting as a base electrode plate.

Powdered nickel having a specific surface area of 5 $m^2/g$ (measured by the B.E.T. method) and acetylene black as powdered carbon were mixed in various amounts to obtain mixtures, and HPC as a binder was added to each mixture to obtain a slurry.

The slurry was coated on the base electrode plate by the roller transfer method and dried at 60° C. to form a conductive layer on a surface of the base electrode plate. The obtained was a cadmium electrode plate.

The acetylene black was used in 0.5 wt.% against the active material.

The above electrode plate was wound together with a nickel sintered positive electrode plate with a separator therebetween to get an electrode assembly. The electrode assembly was put into a cell can to produce a sealed-type nickel-cadmium storage cell (SC size) having a nominal capacity of 1.3 Ah. These cells will be referred to as Cells P.

Cells Q were produced in the same method except that powdered nickel having a specific surface area of 2 $m^2/g$ was used instead of 5 $m^2/g$.

(Test I)

The relationship between the total surface area of the powdered nickel in the conductive layer against 1 g of the active material and the inner gas pressure of the cell was checked regarding Cells P and Q. The cells were continuously charged at 1.3 A (1 C) at 25° C.

Figure 1:
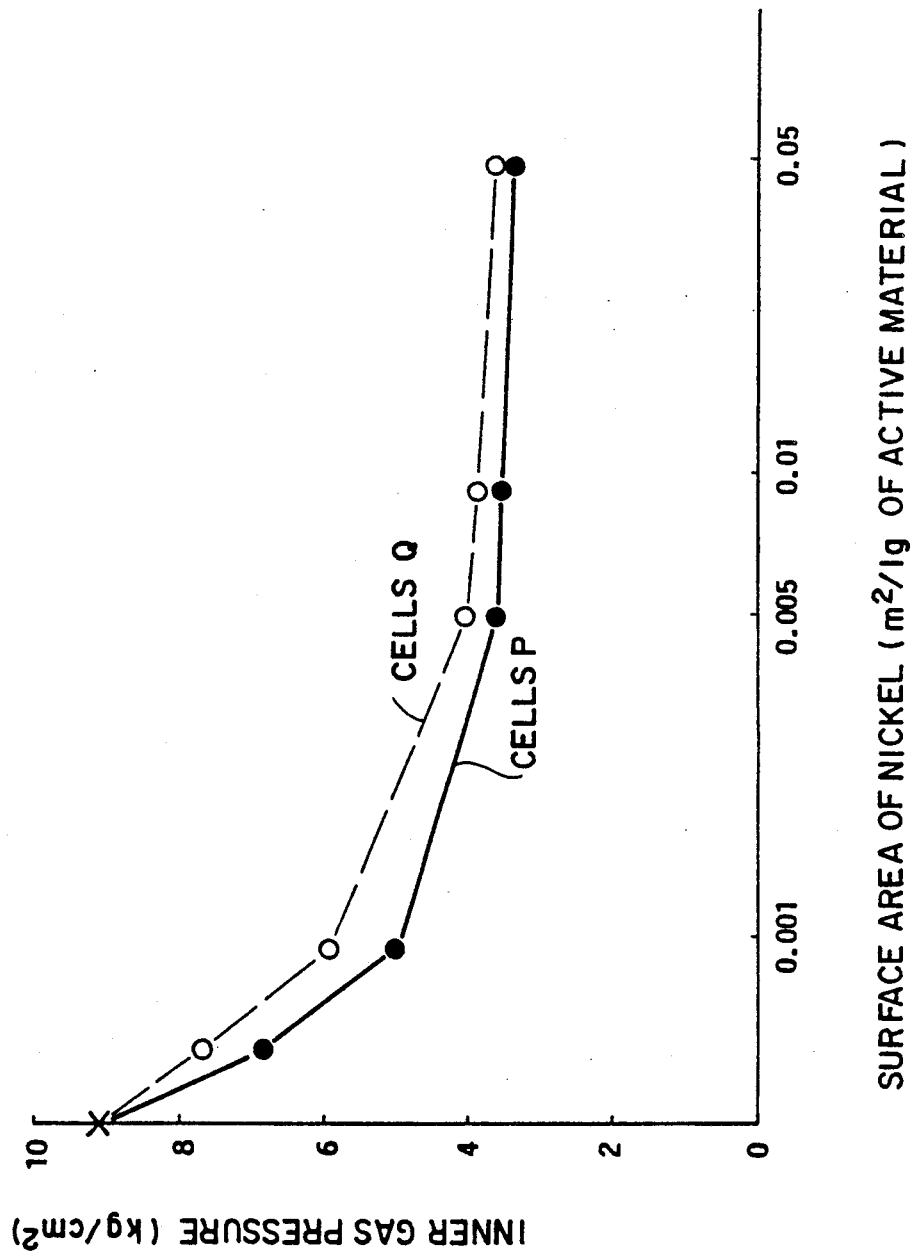
FIG. 1 is a graph showing the relationship between the surface area of powdered nickel and the inner gas pressure of the cell.

The results are shown in FIG. 1. FIG. 1 shows the amount of oxygen gas absorbed by the cell can remarkably be increased by employing the powdered nickel total surface area of 0.001 $m^2/g$ or more against 1 g of the active material, irrespective of the specific surface area of the powdered nickel.

(Test II)

The relationship between the total surface area of the powdered nickel in the conductive layer against 1 g of the active material and the amount of hydrogen gas generated in the cell was checked regarding Cells P and Q. The cells were charged 160% at 2.6 A (2 C) at 10° C.

Figure 2:
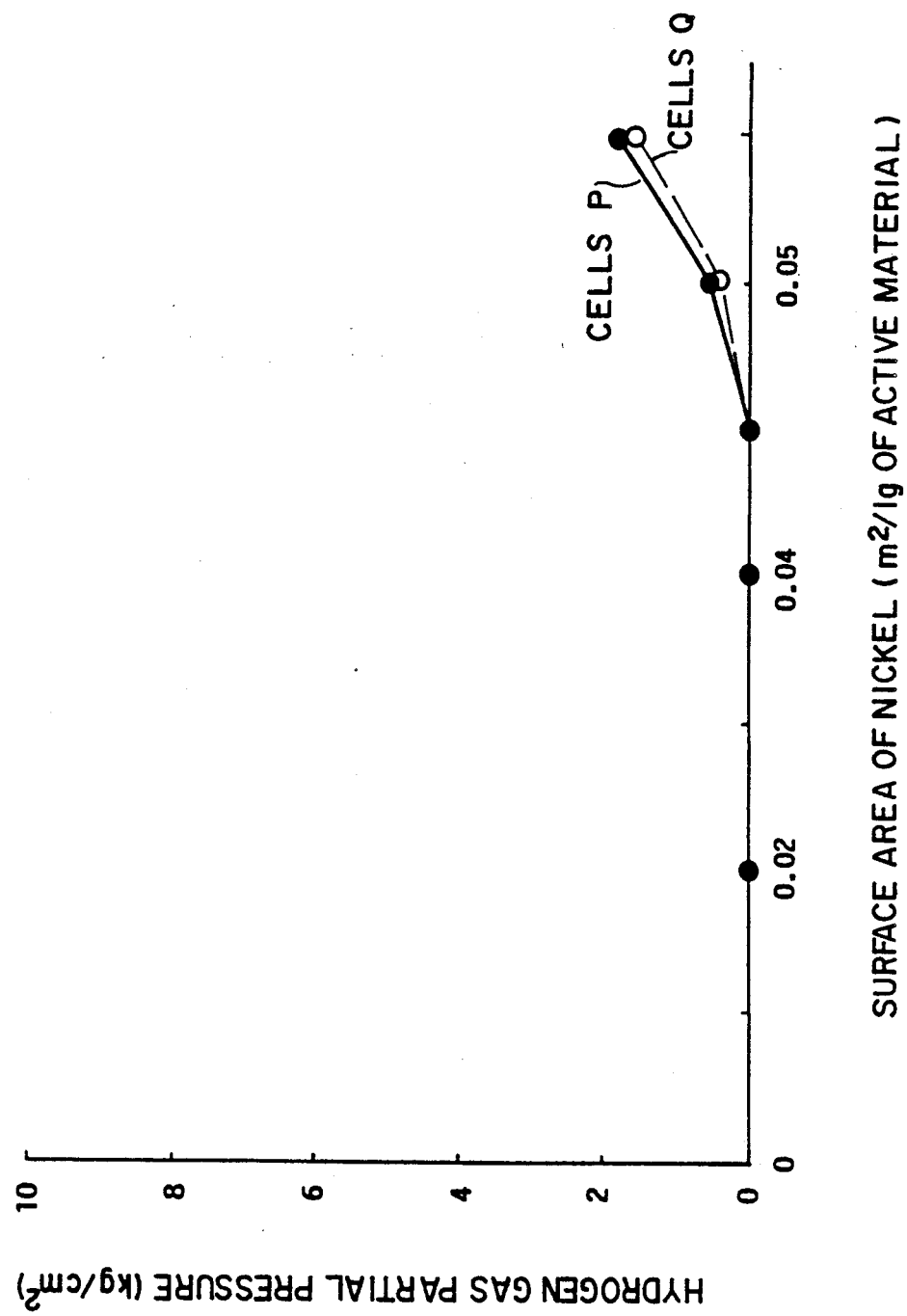
FIG. 2 is a graph showing the relationship between the the surface area of powdered nickel and the hydrogen gas partial pressure of the cell.

The results are shown in FIG. 2. FIG. 2 shows the amount of hydrogen gas generated in the cell can remarkably be increased by employing the powdered nickel having a total surface area of 0.05 $m^2$ or more against 1 g of the active material, irrespective of the specific surface area of the powdered nickel.

It is apparent from Tests I and II that the optimum amount of the powdered nickel as the powdered alkali-resistant metal is 0.001 to 0.05 $m^2/g$ against 1 g of the active material.

Experiment II

A solution comprising acetylene black as powdered carbon and HPC as a binder was added with various apparent densities of powdered nickel and sufficiently stirred to obtain slurries. Each slurry was coated on the base electrode plate which was obtained in Experiment I by the roller transfer method and dried at 60° C. to form a conductive layer on a surface of the base electrode plate. The obtained were cadmium electrode plates each having a conductive layer where both powdered carbon and powdered alkali-resistant metal are existent.

The apparent densities of the powdered nickel were measured by the Kawakita method. The acetylene black was used in 0.8 wt.% against the active material. The powdered nickel was used in 50 wt.% against the acetylene black.

The cadmium electrode plates were respectively wound together with nickel sintered positive electrode plates with separators therebetween to form electrode assemblies. The electrode assemblies were respectively put into cell cans to produce sealed-type nickel-cadmium storage cells (SC size) each having a nominal capacity of 1.3 Ah.

(Test)

The relationship between the apparent density of the powdered nickel in the conductive layer and the inner gas pressure of the cell was checked regarding the above cells. The cells were continuously charged at 1.3 A (1 C) at 25° C.

Figure 3:
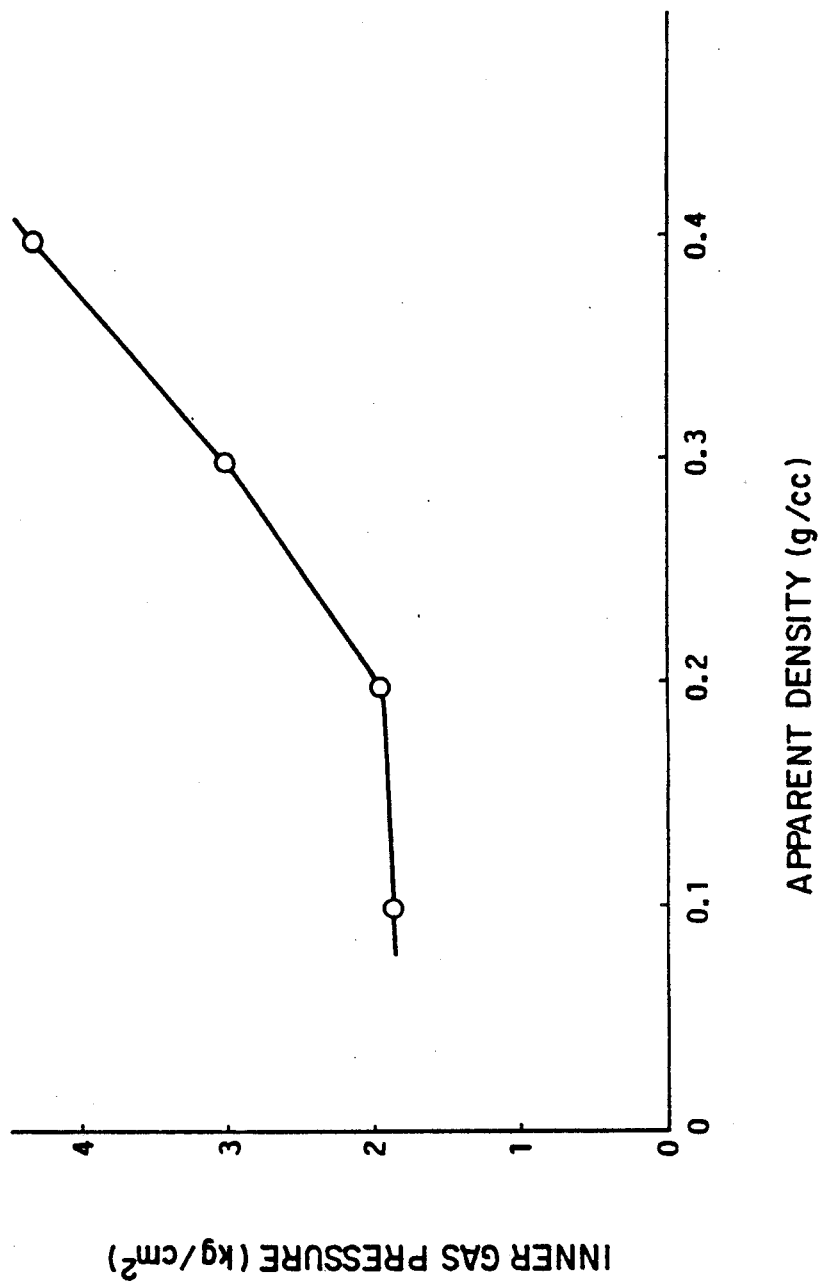
FIG. 3 is a graph showing the relationship between the the apparent density of powdered nickel and the inner gas pressure of the cell.

The results are in FIG. 3. FIG. 3 shows the inner gas pressure of the cell can be lowered by employing the powdered nickel having an apparent density of 0.2 g/cc or less.

Experiment III (Example of the present invention)

Powdered carbonyl nickel (average grain size: 2.5 μm) and HPC as a binder were kneaded to obtain a first slurry, and the first slurry was coated on the base electrode plate obtained in Experiment I and dried at 60° C. to form a first conductive layer on a surface of the base electrode plate.

Acetylene black as powdered carbon and HPC as a binder were kneaded to obtain a second slurry, and the second slurry was coated on the first conductive layer and dried at 60° C. to form a second conductive layer. The obtained cadmium electrode will be referred to as Electrode A.

The powdered carbonyl nickel was used in 0.1 wt.% and the powdered carbon was used in 0.5 wt.% both against the active material.

Electrode A was wound together with a nickel sintered positive electrode with a separator therebetween, and the obtained electrode assembly was put into a cell can to produce a sealed-type nickel-cadmium storage cell (SC size) having a nominal capacity of 1.3 Ah. This cell employing an electrode according to the present invention will be referred to as Cell a.

(Comparative example I)

Electrode $X_1$ was produced in the same method as Electrode A except that only the second conductive layer was formed on the base electrode plate. Cell $x_1$ was produced in the same method employing Electrode $X_1$. The powdered carbon was used in 0.5 wt.% against the active material in the above second conductive layer.

(Comparative example II)

Electrode $X_2$ was produced in the same method as Electrode A except that only the first conductive layer was formed on the base electrode plate. Cell $x_2$ was produced in the same method employing Electrode $X_2$. The powdered carbonyl nickel was used in 0.1 wt.% against the active material in the above first conductive layer.

(Test I)

The relationship between the charging period and the inner gas pressure was checked regarding Cells a, $x_1$ and $x_2$. The cells were continuously charged at 1.3 A (1C) at 25° C.

Figure 4:
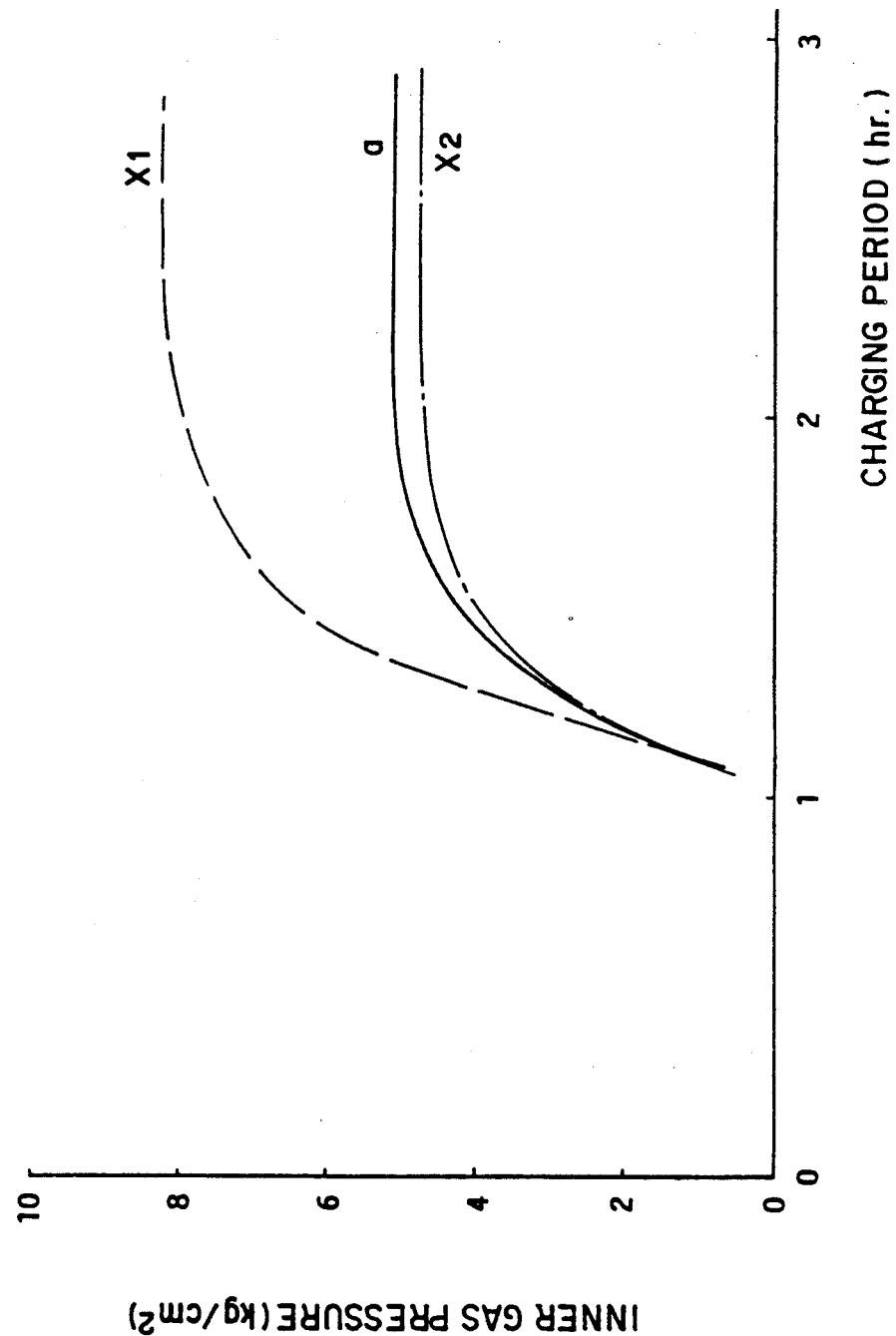
FIG. 4 is a graph showing the relationship between the the charging time and the inner gas pressure regarding Cell a employing an electrode according to this invention and Cells $x_1$ and $x_2$ as comparative examples.

The results are shown in FIG. 4. FIG. 4 shows Cell $x_2$ which has only the first conductive layer (namely, no carbon is included) had substantially as low an inner gas pressure as Cell a employing an electrode according to this invention (including nickel and carbon) did.

(Test II)

The relationship between the hydrogen gas partial pressure and the charging period was checked regarding Cells a, $x_1$ and $x_2$. The cells were charged 200% at 1.3 A (1 C) at 0° C. for 2 hours.

The results are shown in Table 1.

TABLE 1

| | Hydrogen gas partial pressure (kg/cm$^2$) |
|---|---|
| Cell a | 0 |
| Cell $x_1$ | 0 |
| Cell $x_2$ | 5.5 |

Table 1 shows Cells a and $x_1$ restricted hydrogen gas generation.

It is apparent from Tests I and II that Cell a employing an electrode according to this invention was excellent both in absorbing oxygen gas and restricting hydrogen gas generation. This means Electrode A according to this invention, which is produced by forming a first conductive layer including powdered alkali-resistant metal on the surface of the cadmium electrode plate and then forming the second conductive layer including powdered carbon on the first conductive layer, realizes an alkaline storage cell excellent in absorbing oxygen gas, in restricting hydrogen gas generation, and thus in the cycle characteristic.

Embodiment II (Example of the present invention)

Fiber-type nickel having an average fiber diameter of approx. 0.6 μm and a fiber length of several micron meters (produced by INCO Ltd.) as a nickel body, HPC as a binder and a water were mixed and sufficiently stirred to obtain a slurry, and the slurry was coated on a surface of the base electrode plate obtained in Experiment I by the roller transfer method. The obtained cadmium electrode will be referred to as Electrode B.

The fiber-type nickel was used in 100 mg against an SC-size electrode plate.

A sealed-type nickel-cadmium storage cell named Cell b was produced in the same method with Cell a employing Electrode B.

(Comparative example I)

Electrode $Y_1$ was produced in the same method as Electrode B except that fiber-type nickel having an average fiber diameter of approx. 4 μm and a fiber length of 1 mm was used as a nickel body.

Cell $y_1$ was produced in the same method as Cell b employing Electrode $Y_1$.

(Comparative example II)

Electrode $Y_2$ was produced in the same method as Electrode B except that powdered nickel having an average grain size of approx. 2.5 μm was used as a nickel body.

Cell $y_2$ was produced in the same method as Cell b employing Electrode $Y_2$.

(Comparative example III)

Electrode $Y_3$ was produced in the same method as Electrode B except that powdered nickel having an average grain size of approx. 2.5 μm was used as a nickel body in 200 mg against an SC-size electrode plate.

Cell $y_3$ was produced in the same method as Cell b employing Electrode $Y_3$.

(Comparative example IV)

Electrode $Y_4$ was produced in the same method as Electrode B except that no slurry was coated on the base electrode plate.

Cell y₄ was produced in the same method as Cell b employing Electrode Y₄.

(Test)

The relationship between the charging period and the inner gas pressure was checked regarding Cells b and $y_1$ through $y_4$. The cells were charged at 130 mA (0.1 C) for 16 hours, discharged completely at 1.0 C and then again rapidly charged at 1.0 C.

Figure 5:
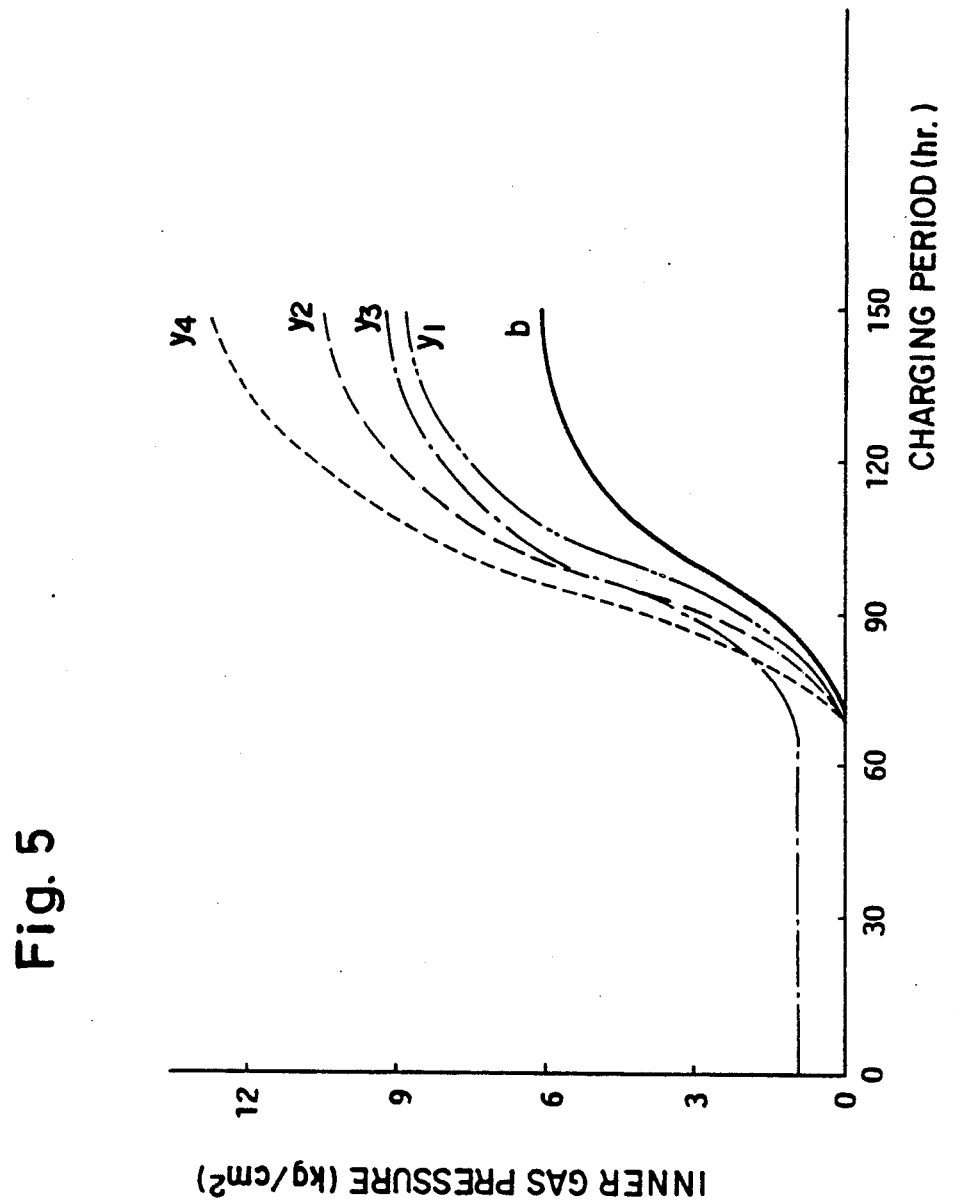
FIG. 5 is a graph showing the relationship between the the charging time and the inner gas pressure regarding Cell b employing an electrode according to this invention and Cells $y_1$ through $y_4$ as comparative examples.

The results are shown in FIG. 5. FIG. 5 shows the cell can be excellent in absorbing oxygen gas by adding a nickel body (Cells b and $y_1$ through $y_3$). The high inner gas pressure of Cell $y_3$ at the initial stage of charging is attributed to that the large amount of nickel body caused hydrogen gas generation.

Among the above cells employing nickel, Cell b employing an electrode according to the present invention was most excellent in absorbing oxygen gas. This is attributed to that the nickel body of Cell b had as small an average fiber diameter as 0.6 μm. If the average fiber diameter or average grain size exceeds 1 μm, the nickel body gets poor in flexibility enough to pierce into the separator, whereby to possibly cause shortcircuiting. Therefore, the average fiber diameter or average grain size of the nickel body is desirably 1 μm or less.

The nickel body having an average fiber diameter or grain size of 1 μm or less which was used in Embodiment II had a structure in which fiber and grains are contacted and/or sintered to be connected with one another while being uniformly directed.

Although the slurries were coated by the roller transfer method in the above embodiments, they may also be sprayed, impregnated, etc.

Embodiment III

A solution of cadmium salt including various amounts of indium and powdered zinc were substitute-reacted with each other to obtain various kinds of powdered metal cadmium including indium. 20 wt.% of each kind of the above powdered metal cadmium and 80 wt.% of powdered cadmium oxide were mixed to obtain a powdered active material. The powdered active material, a solution of methyl cellulose, nylon fiber, and the like were kneaded to get an active material paste. The active material paste was coated on a conductive substrate formed of a punched metal and dried to obtain a base electrode plate.

Powdered nickel having a specific surface area of 5 m²/g (measured by the B.E.T. method) and acetylene black as powdered carbon were mixed in various amounts to obtain mixtures, and methyl cellulose was added to each mixture to obtain a slurry. The slurry was coated on each base electrode plate by the roller transfer method and dried to form a conductive layer on a surface of the base electrode plate. The obtained was a cadmium negative electrode plate.

Each cadmium negative electrode plate and a nickel sintered positive electrode plate were wound together with a separator therebetween to get an electrode assembly, and the assembly was put into a cell can to produce a sealed-type nickel-cadmium storage cell (SC size) having a nominal capacity of 1.3 Ah.

(Test I)

The relationship between the weight ratio (%) of indium against the whole powdered active material and the utilization factor of the negative electrode plate was checked regarding the above cadmium negative electrode plates. Each cadmium negative electrode plate was charged 160% at 0.3 A in an excessive 25 wt.% of aqueous solution of potassium hydroxide, using a metal nickel plate for the opposite electrode, and then discharged at 0.5 A until the voltage was reduced to −1.0 V.

Figure 6:
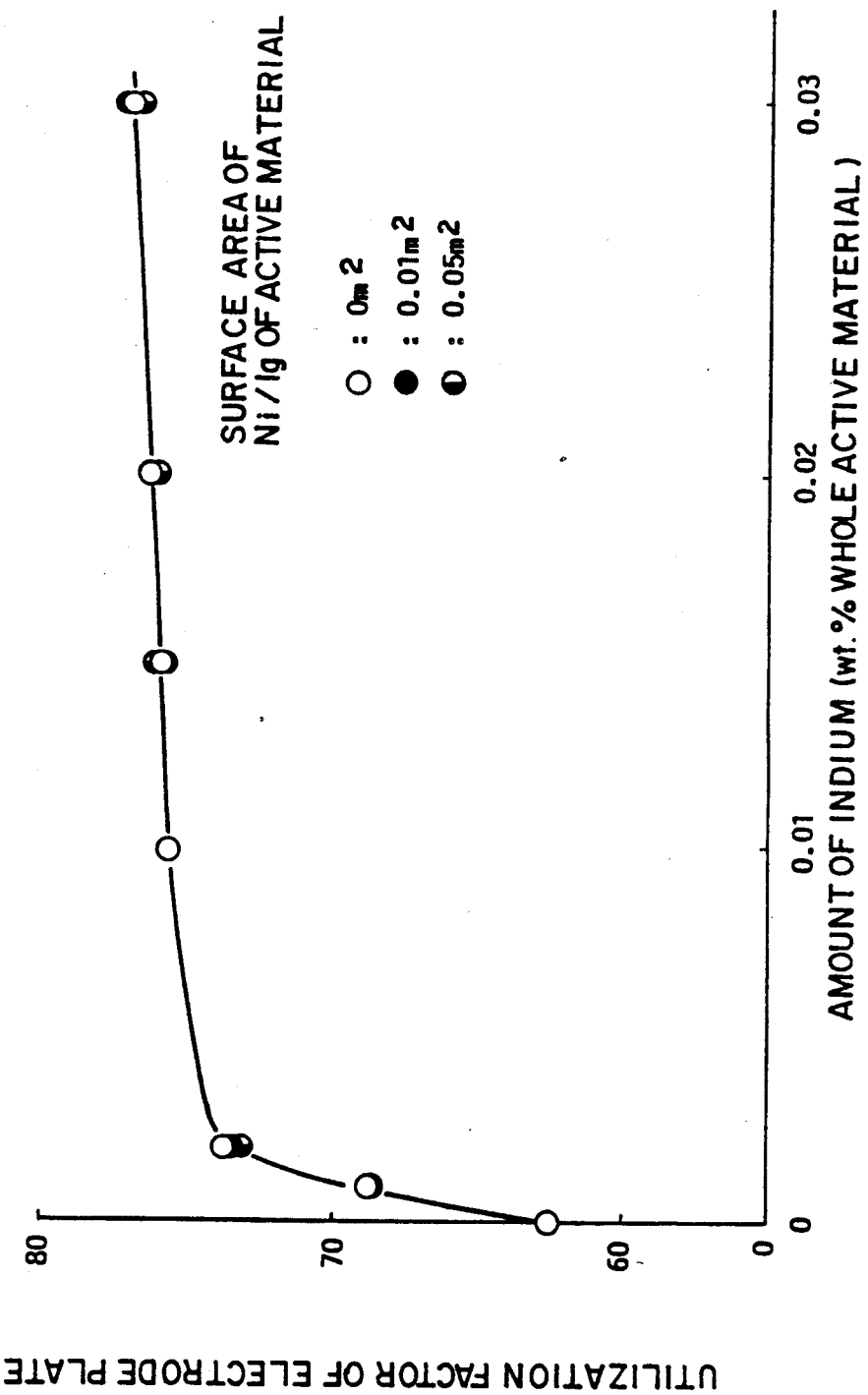
FIG. 6 is a graph showing the relationship between the amount of indium against the whole active material and the utilization factor the active material.

The results are shown in FIG. 6. In FIG. 6, each electrode plate indicated by ○ included nickel in the conductive layer with a surface of 0 m² against 1 g of the active material, each one indicated by ● with a surface area of 0.01 m², and each one indicated by ◐ with a surface area of 0.05 m².

FIG. 6 shows the utilization factor was remarkably increased when the amount of indium in the metal cadmium was 0.002 wt.% or more against the whole active material, irrespective of the surface area of nickel in the conductive layer.

(Test II)

The relationship between the surface area of the nickel in the conductive layer against 1 g of the active material and the inner gas pressure was checked regarding the above cells. The cells were charged at 1.3 A at a room temperature and the pressures were measured when they got into an equilibrium state.

Figure 7:
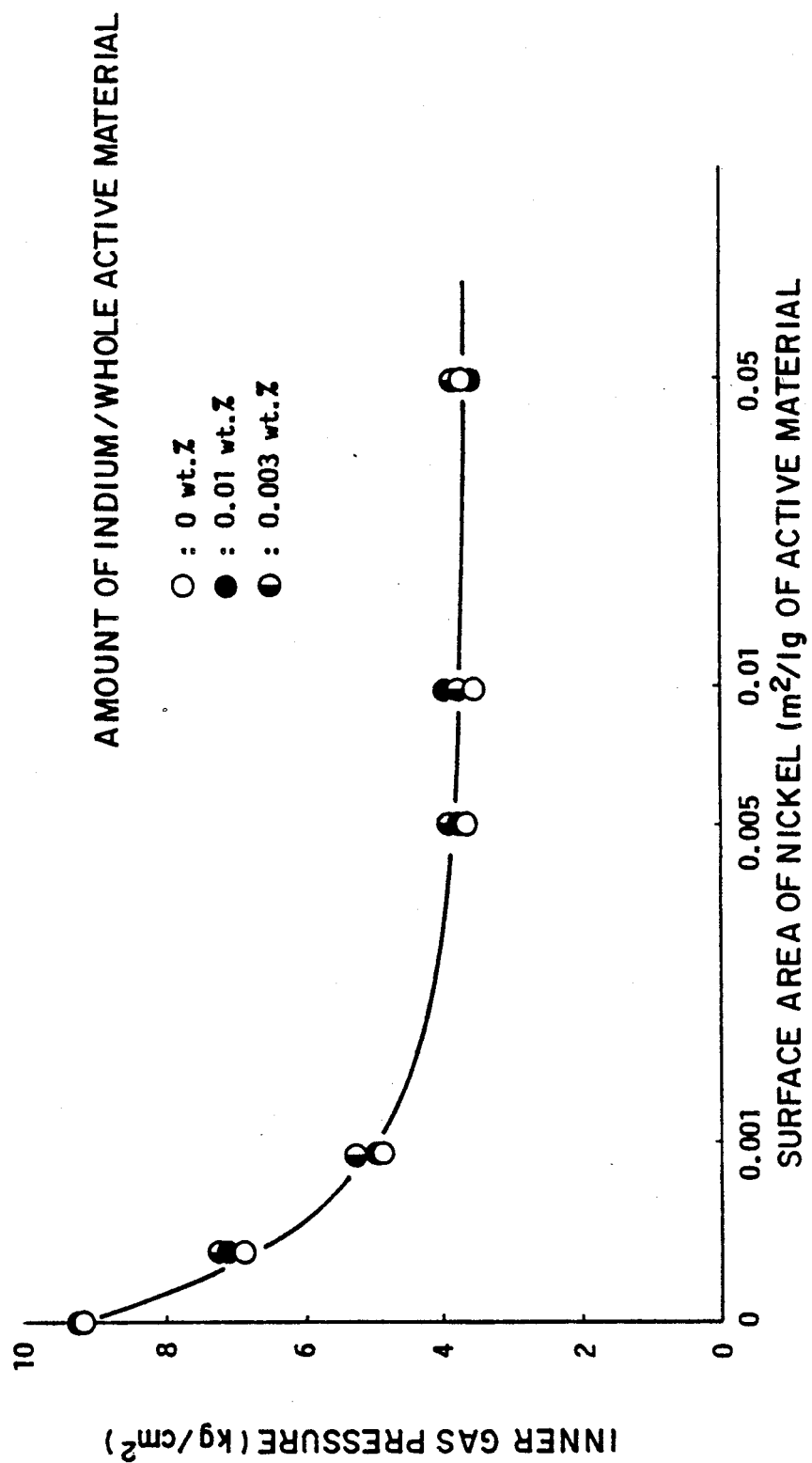
FIG. 7 is a graph showing the relationship between the surface area of nickel against 1 g of the active material and the inner gas pressure of the cell.

The results are shown in FIG. 7. In FIG. 7, each cell indicated by ○ had indium in 0 wt.% against the whole active material, each cell indicated by ● in 0.01 wt.%, and each cell indicated by ◐ in 0.03 wt.%. In this test, only oxygen gas was generated, but no hydrogen gas was.

It is apparent from FIG. 7 that the amount of oxygen gas absorbed was increased and so the inner gas pressure was lowered when the surface area of the nickel was 0.001 m² or more against 1 g of the active material.

(Test III)

The relationship between the surface area of the nickel against 1 g of the active material and the hydrogen gas partial pressure was checked regarding the above cells. The cells were charged 160% at 2.6 A at 10° C.

Figure 8:
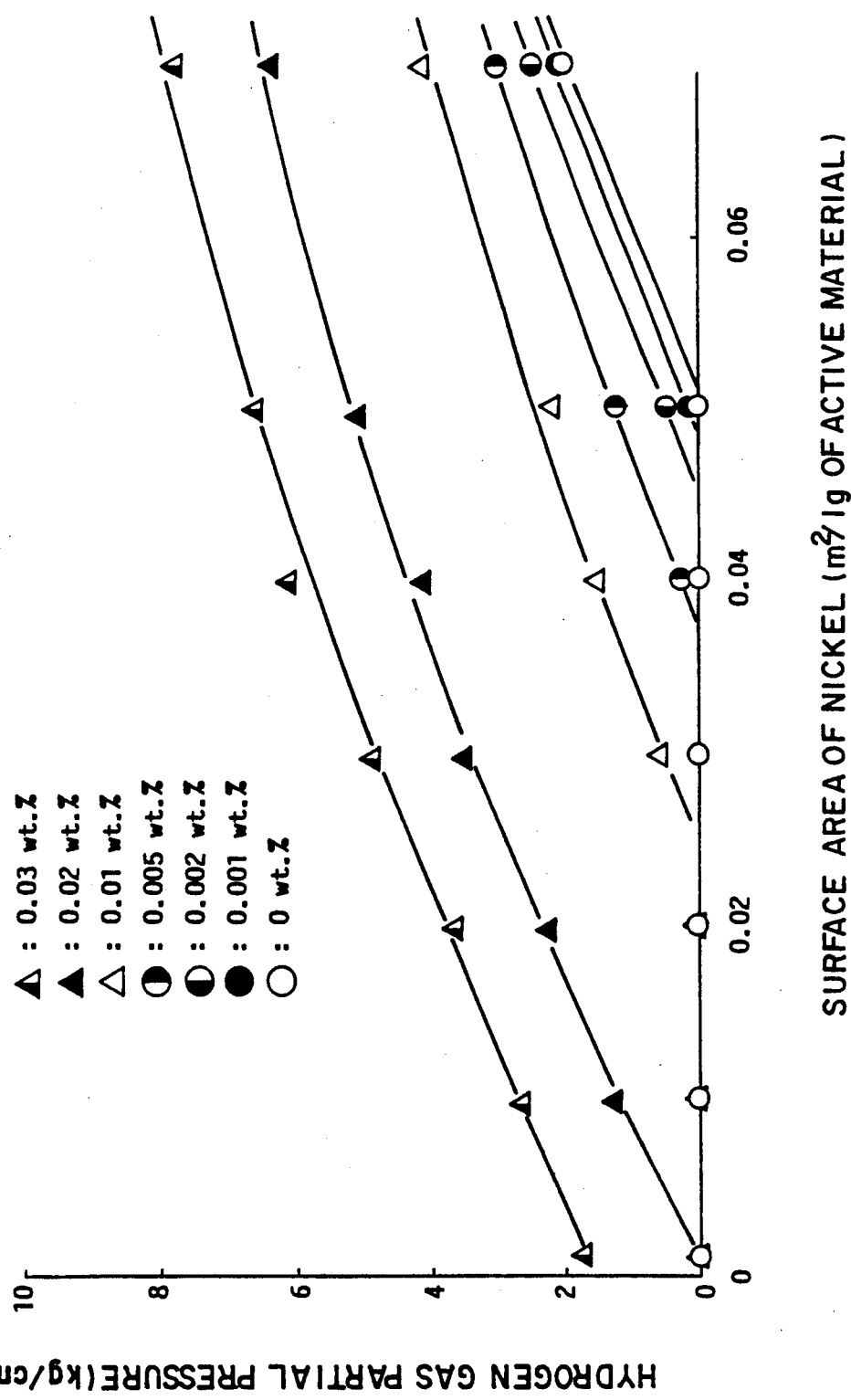
FIG. 8 is a graph showing the relationship between the surface area of nickel against 1 g of the active material and the hydrogen gas partial pressure of the cell.

The results are shown in FIG. 8. The symbols used in FIG. 8 indicate the weight ratios of indium against the whole active material which are shown in Table 2.

TABLE 2

| Symbol | Amount of indium (wt. %) | Symbol | Amount of indium (wt. %) |
|---|---|---|---|
| ○ | 0 | △ | 0.01 |
| ◐ | 0.001 | ▲ | 0.02 |
| ◑ | 0.002 | ▲ | 0.03 |
| | 0.005 | | |

It is apparent from FIG. 8 that the upper limit of the amount of nickel for preventing hydrogen gas generation depends on the amount of indium. The larger the amount of indium is added, the lower the upper limit of the nickel amount is.

Figure 9:
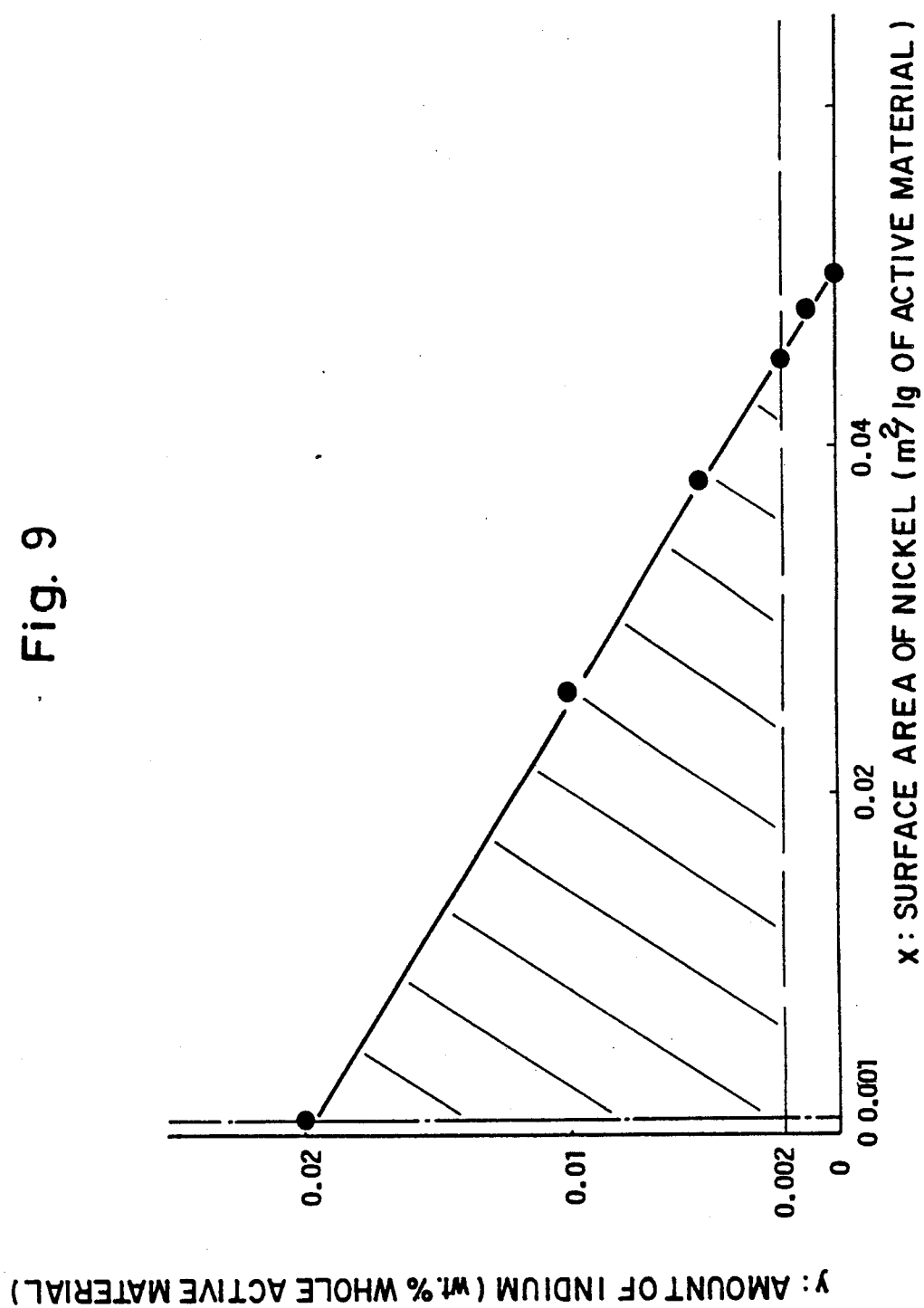
FIG. 9 is a graph showing the optimum relative values of the amount of indium and the surface area of nickel.

The results of Tests I, II and III are summarized in FIG. 9. The shaded part shows the optimum relative values between the amount of indium on the cadmium negative electrode plate and the surface area of nickel against 1 g of the active material. In FIG. 9, x shows the surface area (m²) of nickel per 1 g of the active material, and y shows the weight ratio (%) of indium against the whole active material. Each ● indicates the upper limit of nickel for each amount of indium shown in FIG. 8. It is apparent from FIG. 9 that determining x and y to realize $x \geq 0.001$, $y \geq 0.002$, and $Y \leq -0.4x + 0.02$ results in a cadmium negative electrode plate excellent in the utilization factor and in absorbing oxygen gas without generating any hydrogen gas.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A paste-type cadmium electrode for use in an alkaline storage cell, comprising:
   a conductive substrate;
   an active material layer mainly comprising cadmium oxide and formed on a surface of said conductive substrate; and
   a conductive layer formed on a surface of said active material layer, said conductive layer having therein powdered carbon and powdered alkali-resistant metal having a surface area of 0.001 to 0.05 m² against 1 g of said active material.

2. A paste-type cadmium electrode of claim 1, wherein the powdered alkali-resistant metal comprises powdered nickel.

3. A paste-type cadmium electrode for use in an alkaline storage cell, comprising:
   a conductive substrate;
   an active material layer mainly comprising cadmium oxide and formed on a surface of said conductive substrate; and
   a conductive layer formed on a surface of said active material layer, said conductive layer comprising powdered carbon, a binder and powdered alkali-resistant metal having an apparent density of 0.2 g/cc or less.

4. A paste-type cadmium electrode of claim 3, wherein the powdered alkali-resistant metal comprises powdered nickel.

5. A paste-type cadmium electrode for use in an alkaline storage cell, comprising:
   a conductive substrate;
   an active material layer mainly comprising cadmium oxide and formed on a surface of said conductive substrate;
   a first conductive layer formed on a surface of said active material layer, said first conductive layer comprising powdered alkali-resistant metal and a binder; and
   a second conductive layer formed on a surface of said first conductive layer, said second conductive layer comprising powdered carbon and a binder.

6. A paste-type cadmium electrode of claim 5, wherein the powdered alkali-resistant metal comprises powdered nickel.

7. A paste-type cadmium electrode for use in an alkaline storage cell, comprising:
   a conductive substrate;
   an active material layer mainly comprising cadmium oxide and formed on a surface of said conductive substrate; and
   a nickel body dispersed on a surface of said active material layer, said nickel body comprising at least one of fiber-type nickel having an average fiber diameter of 1 $\mu$m or less and powdered nickel having an average grain size of 1 $\mu$m or less.

8. A paste-type cadmium electrode of claim 7, wherein said nickel body has a structure in which fibers and grains are contacted to be connected with one another while being uniformly directed.

9. A paste-type cadmium electrode of claim 7, wherein said nickel body has a structure in which fibers and grains are sintered to be connected with one another while being uniformly directed.

10. A paste-type cadmium electrode comprising an electrode plate and a conductive layer formed on the electrode plate, the electrode plate mainly comprising powdered cadmium oxide and powdered metal cadmium including indium and the conductive layer having therein powdered carbon and powdered nickel, wherein the above cadmium electrode is characterized in that $x \geq 0.001$, $7 \geq 0.002$ and $y \leq -0.4x + 0.02$, where y is a weight ratio (%) of the indium against an active material comprising powdered cadmium oxide and powdered metal cadmium including indium and x is a surface area of the nickel against 1 g of the active material.

11. A paste-type cadmium electrode of claim 10, wherein the powdered metal cadmium including indium is produced by reacting a solution of cadmium salt including indium and powdered zinc.

* * * * *